United States Patent [19]
Schwartz

[11] 3,993,870
[45] Nov. 23, 1976

[54] TIME MULTIPLEX SYSTEM WITH SEPARATE DATA, SYNC AND SUPERVISION BUSSES

[75] Inventor: Norman L. Schwartz, Stony Brook, N.Y.

[73] Assignee: Multiplex Communications, Inc., Hauppage, N.Y.

[22] Filed: Mar. 5, 1975

[21] Appl. No.: 555,562

Related U.S. Application Data

[63] Continuation-in-part of Ser. No. 414,434, Nov. 9, 1973, Pat. No. 3,916,106.

[52] U.S. Cl. .................... 179/15 BS; 179/15 BA; 179/15 AT
[51] Int. Cl.² ........................................ H04J 5/00
[58] Field of Search ......... 179/15 A, 15 AL, 15 AT, 179/15 BA, 15 BS, 15 BM, 15 AS

[56] References Cited
UNITED STATES PATENTS

| | | | |
|---|---|---|---|
| 3,728,492 | 4/1973 | Cappetti | 179/15 AL |
| 3,755,628 | 8/1973 | Games | 179/15 BS |
| 3,787,820 | 1/1974 | Sherman | 179/15 A |
| 3,800,290 | 3/1974 | Croxon | 179/15 A |
| 3,818,143 | 6/1974 | Vrba | 179/15 A |
| 3,821,480 | 6/1974 | Dundon | 179/15 A |
| 3,851,105 | 11/1974 | Regan | 179/15 AT |
| 3,870,825 | 3/1975 | Roberts | 179/15 BS |
| 3,890,469 | 6/1975 | Kelly | 179/15 AT |

*Primary Examiner*—William C. Cooper
*Assistant Examiner*—E. S. Kemeny
*Attorney, Agent, or Firm*—Hopgood, Calimafde, Kalil, Blaustein & Lieberman

[57] ABSTRACT

Each recurring time slot of a time division multiplex communication system is identified by a comparator in a terminator unit, using the unique combination of phase relationships among a plurality of synchronization signals. The comparator is latched during the appropriate time slot by a supervision bus signal. Each of a plurality of terminators sends and receives samples of data input and output to and from an information path consisting of a bundle of discrete lines or buses. Communication between a particular terminator and a particular line of the information path is gated only during a recurring preselected time slot. A particular terminator selects samples sequentially from each successive line of the information path. These samples are then added together to reconstitute the signal. Samples of outgoing signals are similarly distributed over a plurality of lines in sequence.

8 Claims, 2 Drawing Figures

TIME MULTIPLEX SYSTEM WITH SEPARATE DATA, SYNC AND SUPERVISION BUSSES

RELATED APPLICATION

The present application is a continuation-in-part of the inventor's earlier application Ser. No. 414,434 entitled Communication System, filed Nov. 9, 1973 and now U.S. Pat. No 3,916,106.

BACKGROUND OF THE INVENTION

The present invention relates to a time-division multiplex communication system, and more particularly a new and improved communication system in which recurring time slots are each uniquely identified by simultaneously occuring synchronization signals and information is carried by a path consisting of a bundle of discrete time division lines.

Electronic communication systems were at one time based exclusively on space-division techniques. That is, electromagnetic switches were used to establish connections along discrete paths each path being dedicated solely to a particular connection throughout its duration. This required large numbers of interconnecting lines in relation to the total number of system inputs and outputs. Moreover, bulky, slow and expensive servo mechanisms were relied on to establish the desired connections.

With the advent of more sophisticated solid state switching devices and the availability of integrated circuit modules has come the use of time division for information transmission. This sampling technique enables a large number of users to communicate over a single line or bus while only selected interconnections among these users are established. The composite signal passing over the time-division line is divided into a series of frames. Each frame is divided into a series of time slots and each time slot occurs once per frame.

All communicating locations must be synchronized to a common time base so that the desired recurring time slots can be reliably identified. Synchronization is most commonly accomplished by a periodically occuring sync signal superimposed on the information carried by the time-division path, the sync pulses being identifiable by a predetermined characteristic such as amplitude superiority. Conventional synchronization techniques often require an oscillator or counter at each user location with periodic correction in response to the sync signals so that errors are not cumulative. A part of the signal-carrying capacity of the system must therefore be dedicated to the sync pulses, thus diminishing useful information capacity.

Most presently known time division communication systems are relatively complex and expensive, thus not permitting their usage for many purposes. They are generally predicted on the assumption that only a small percentage of possible user locations will be active at any one time, and the synchronization techniques conventionally employed require relatively elaborate circuitry at each location. When the percentage of possible simultaneous users approaches the total number of users connected to the system, the synchronization information becomes sufficiently complex and voluminous to greatly diminish the capacity of the system to transmit information. Efforts to simplify synchronization have, in the past, succeeded only at the expense of reliability.

Another disadvantage of presently known time division systems is that they are applicable only to situations in which an approximation of the transmitted signal based on a limited number of separated samples is adequate for the purpose of the system.

SUMMARY OF THE INVENTION

The present invention fills a long-felt need for a comparatively simple and highly reliable time-division communication system. It utilizes an information path consisting of a bundle of discrete lines for carrying recurring time-division samples of the information to be communicated and a separate synchronization path that carries synchronization signals that are used to synchronize input/output devices by which various types of user apparatus, such as computer terminals, may be connected to the system. Successive samples of an individual signal are distributed sequentially over the discrete lines of the information path. The arrangement may be such that each successive sample of a particular signal follows immediately upon the preceeding sample. Thus, when all of the samples of a signal are summed by a demultiplexer, substantially the entire signal is recovered. Supervision signals may be carried by a third separate path.

An oscillator means is provided to generate a continuous recurring series of synchronization pulses which are supplied via the synchronization path to uniquely identify each time slot. According to a preferred arrangement, the oscillator means generates a plurality of signals at different frequencies, and a unique combination of phase relationships among these signals identifies each recurring time slot.

Data input and output to the information path is provided by a plurality of terminator means, each including a comparator means for receiving the signals carried by the synchronization path and for producing a comparator output in response to a preselected synchronization signal. A counter within each terminator is reset once per frame of time slots by the comparator and advanced once per time slot by a clock. The counter is used to synchronize a multiplexer and a demultiplexer to the information path.

BRIEF DESCRIPTION OF THE DRAWINGS

For a more detailed understanding of the invention, reference may be made to the description below taken in conjunction with the accompanying drawing wherein.

DESCRIPTION OF THE PREFERRED EMBODIMENT

Figure 1:
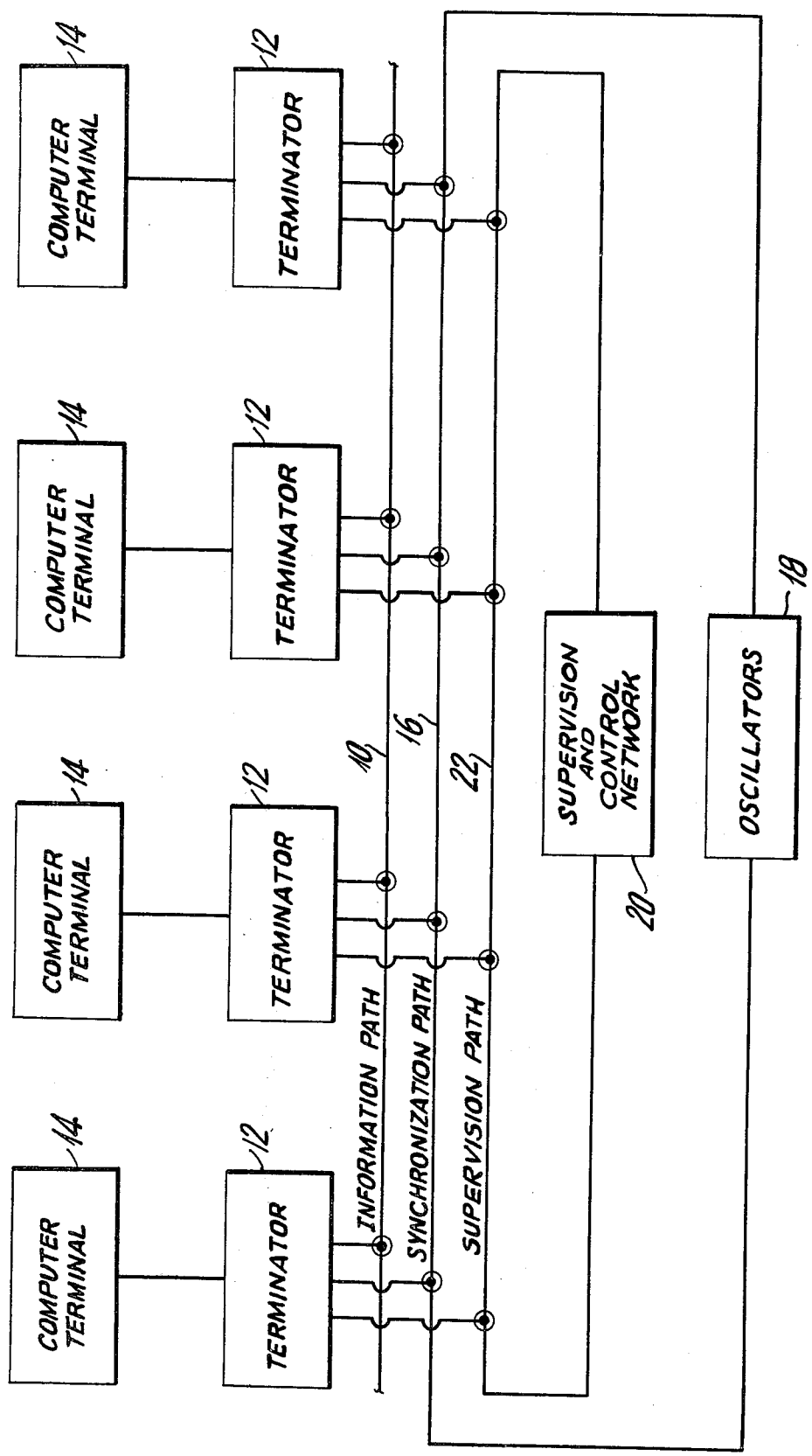
FIG. 1 is a diagram of a time division communication system constructed in accordance with the invention.

In the communications system of this invention, the information to be communicated is time division multiplexed onto an information path 10 which consists of a bundle (shown by the circled bus points in FIG. 1) of discrete lines. Input and output of this muliplexed information is fascilitated by a plurality of terminators 12 (four representative terminators being shown in FIG 1). Each terminator 12 selects the samples pertaining to the connection or connections in which it is taking part by identifying the appropriate recurring time slots and supplies that information to conventional electronic equipment such as a computer terminal 14. The information may be digital or analogue and may have any type of content desired.

The terminators 12 are also connected to a synchronization path 16 which carries the output of an oscillator means 18. The output of this oscillator means 18 corresponding in time to any given recurring time slot uniquely identifies that time slot. The oscillator means 18 may comprise a plurality of separate oscillators or a single oscillator connected to conventional frequency dividers or multipliers.

In the preferred embodiment of the invention, the synchronization path 16 comprises a plurality of discrete lines, each of which carries a signal of a different frequency produced by the oscillator means 18. The lowest frequency has a period equal to the length of a complete frame of time slots. The next higher frequency is twice the lowest frequency and each successive higher frequency is twice the one before it. The highest frequency has a period equal to the duration of an individual time slot. Thus each frequency is an integral multiple of the lowest frequency and all synchronization signals are in phase when the lowest frequency commences a new cycle. Each recurring time slot is identified by a unique combination of phase relationships among the signals produced by the oscillator means 18.

At a centralized location, a supervision and control network 20 sets up and tears down connections between the various terminators 12 over commonly assigned time slots. The necessary information is transmitted over a supervision path 22.

Figure 2:
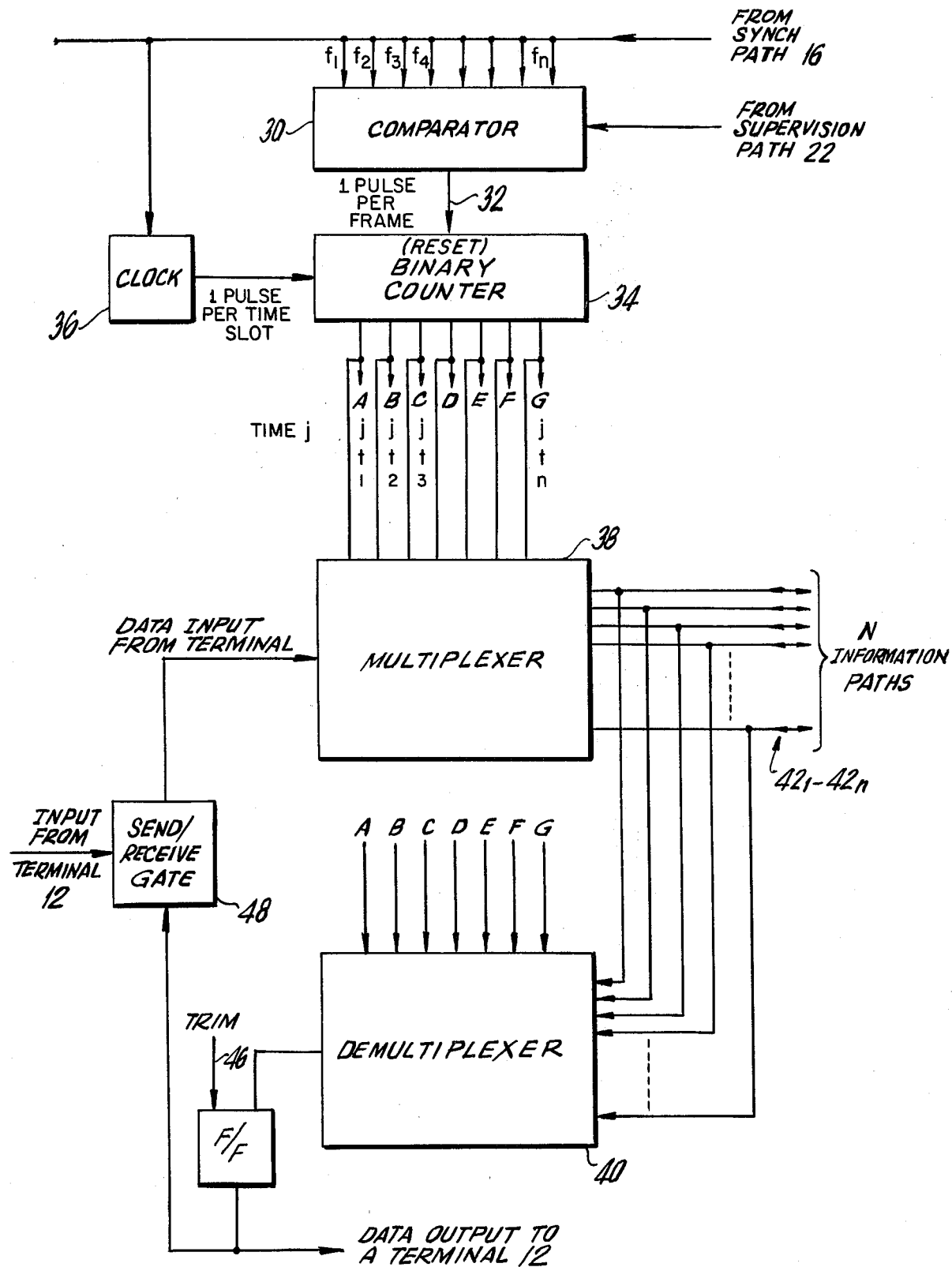
FIG. 2 is a schematic drawing of a terminator used in the system of FIG. 1.

One of the terminators 12 of FIG. 1 is shown in greater detail in FIG. 2. For synchronization prupoises, it includes a comparator 30 which produces an output only in response to a selected signal from the synchronization path 16 indicating the presence of the time slot assigned to that particular terminator by the supervision means 20. Thus, during the occurency of each time slot, the comparator 30 will receive a series of inputs from the synchronization path 16. However, only during one particular recurring time slot will the phase relationship of the signals produced by the oscillator means 18 coincide with the combination to which the comparator 30 is responsive. When this unique combination occurs, the comparator 30 produces an output on a line 32.

The comparator 30 can be set to be responsibe to any desired combination of synchronization signals by a latching signal supplied by the supervision path 22. This latching signal latches or sets the comparator 30 at the combination of phase relationships simultaneously produced by the oscillator means 18. Thus, the desired time slot within a frame of time slots can be fully identified to the terminator 12 by the timing of the latching signal without reference to any other variable thereby greatly simplifying the supervision function.

In addition to the comparator 30, each terminator 12 contains a binary counter 34 which is reset once per frame by an output of the comparator 30 on the line 32. After being reset by the comparator 30, the counter 34 is advanced once per frame by a clock 36 which is responsive to a signal taken from the synchronization path 16. Accordingly, the counter 34 is always reset at a particular recurring time slot and then counts each successive time slot until a full frame has passed. With the occurrence of each time slot thus defined, a sample of information pertaining to the connection in which the terminator 12 is involved occurs in the next sequential discrete line of the information path 10. Thus the counter 34 keeps track of the location of successive samples pertinent to the connection.

The various comparators 30 of the terminators 12 are latched at different combinations and are therefore reset at different times. Each terminator is enabled by its counter 34 to follow its connection through the successive lines of the information path 10 and assemble the samples that, when added together, form a composite signal.

In a preferred arrangement the number of discrete lines in the information path 10 is equal to the number of time slots in a frame, and each successive sample of a signal follows immediately upon the preceding sample. Therefore when the samples of a signal are added together, substantially the entire signal can be reconstituted without approximating the omitted interstitial portions.

Responsive to the outputs of the counter 34 are a multiplexer 38 and a demultiplexer 40. The outputs of the counter are produced on a series of lines $42_1 - 42_n$ ($n$ being the number of time slots in a frame).

The multiplexer 38 is connected to each discrete line of the information path 10 (in the preferred arrangement there are $n$ such lines). When the terminator 12 is operating in the send mode, these discrete lines are sequentially connected to the corresponding terminal 14 for transmission of a sample in synchronization with an output on the line 42 that corresponds to that discrete line of the information path 10.

In the receive mode, the demultiplexer 40 is similarly responsive to the same outputs of the lines $42_1 - 42_n$ for connection to the terminal 14. The output of the demultiplexer 40 is supplied to a flip-flop 44 which indicates by its high or low state the binary character of the information received. Of course the flip-flop 44 would not be used with analogue information. The output of the flip-flop 44 is trimmed in the conventional menner by trim pulses supplied via a line 46 from the supervision path 22.

Part of the output of the flip-flop 44 is supplied to a conventional send/receive gate 48 which prevents the flow of information from the terminal 14 to the multiplexer 38 when an incoming signal is present.

The apparatus of the present invention, because it provides a high sampling rate and allows reconstitution of substantially the entire signal if desired, is particularly well suited to use in a transparent system, i.e., a system in which the data bit rate is variable or unknown. However, if it is desired to operate at a fixed bit rate with each sample corresponding to a single binary bit, shift registers may be used to accumulate outgoing information and feed to the multiplexer 38 at the fixed rate. Because the time slots are distributed over a plurality of discrete lines, the maximum frequency of the system is less than that which would result if the same total number of samples were carried by a single line. Thus, unmanagably high frequencies can be avoided.

The above-described embodiment of the invention is intended to be merely exemplary and does not limit the scope of the inventive concept. For example, less than all the discrete lines of the information path may be sampled by a terminator. Numerous additional variations and modifications within the spirit and scope of the invention will occur to those skilled in the art.

I claim:

1. Time-division multiplex communication system including an information path consisting of a plurality of discreet lines for carrying samples of signals transmitted within selected time slots recurring once per frame, a synchronization path for carrying synchronization signals which separately identify time slots as they occur, and oscillator means for generating a recurring series of synchronization signals supplied to the synchronization path each signal uniquely identifying a simultaneously occuring time slot, wherein the improvement comprises a plurality of terminator means for providing data inputs to the information path and receiving data outputs from the information path, each terminator including comparator means for receiving the signals carried by the synchronization path and for periodically producing a comparator output in response to the occurrence of a preselected synchronization signal combination, demultiplexer means for summing successive input samples sequentially selected from more than one discreet line of the information path, said demultiplexer being responsive to the oscillator means for synchronization with the information path, and multiplexer means for sequentially distributing successive output samples among more than one discreet line of the information path.

2. The communication system of claim 1 wherein the oscillator means produces a plurality of signals of differing frequencies, each recurring time slot being identified by a unique combination of phase relationships occuring among said signals.

3. The communication system of claim 1 wherein the oscillator means produces a plurality of signals of different frequencies, the lowest frequency being at least equal to the frequency with which each time slots recurs, each recurring time slot being identified by a unique combination of phase relationships among said signals.

4. The communication system of claim 3, wherein the highest frequency produced by said oscillator means is at least equal to the frequency with which each time slot recurs in a discrete line of the information path multiplied by the number of recurring time slots in a frame.

5. The communication systme of claim 1 wherein the oscillator means produces a pluraltiy of signals of different frequencies, the lowest frequency being at least equal to the frequency with which each time slot recurs, each recurring time slot being identified by a unique combination of phase relationships among said frequencies, and the synchronization path including at least one discrete line dedicated to each frequency produced by the oscillator means.

6. The communication system of claim 1, further comprising latching means included in each terminator connected to the supervision path and responsive to latching signals carried thereon for setting the comparator means to be responsive to a synchronization signal occuring simultaneously with the latching signal.

7. The communication system of claim 1, further comprising clock means responsive to the oscillator means for producing clock pulses and counter responsive to the output of the comparator means and the clock pulses, said counter being reset once per frame by the comparator means and advanced once per time slot by the clock pulses, the demultiplexer means and multiplexer means being responsive to the counter for synchronization with the occurrence of time slots in the information path.

8. The communication system of claim 1, wherein the number of time slots per frame is equal to the number of discrete lines from which samples are received by each terminator, whereby each sample received by the terminator follows immediately upon the previous sample and substantially the entire signal is reconstituted by the demultiplexer means

* * * * *